(12) United States Patent
Han

(10) Patent No.: US 11,985,264 B1
(45) Date of Patent: May 14, 2024

(54) MOBILE PHONE STAND WITH EXHIBITION PART

(71) Applicant: Zhefu Han, Haikou (CN)

(72) Inventor: Zhefu Han, Haikou (CN)

(*) Notice: Subject to any disclaimer, the term of this patent is extended or adjusted under 35 U.S.C. 154(b) by 0 days.

(21) Appl. No.: 18/201,784

(22) Filed: May 25, 2023

(30) Foreign Application Priority Data

| Mar. 6, 2023 | (CN) | 202320397323.3 |
| Mar. 6, 2023 | (CN) | 202320397422.1 |
| Apr. 7, 2023 | (CN) | 202320756277.1 |

(51) Int. Cl.
| *A47B 23/04* | (2006.01) |
| *F16M 11/38* | (2006.01) |
| *H04M 1/04* | (2006.01) |
| *A47B 19/08* | (2006.01) |

(52) U.S. Cl.
CPC .......... *H04M 1/04* (2013.01); *F16M 11/38* (2013.01); *A47B 19/08* (2013.01); *A47B 23/043* (2013.01)

(58) Field of Classification Search
CPC ..... A47B 19/08; A47B 23/043; A47B 23/046; F16M 11/10; F16M 11/38
USPC .... 248/346.2, 458, 460, 461, 462, 448, 454, 248/455, 456, 457
See application file for complete search history.

(56) References Cited

U.S. PATENT DOCUMENTS

| 7,819,373 | B1* | 10/2010 | Tsai | F16M 11/10 248/910 |
| 8,757,374 | B1* | 6/2014 | Kaiser | G06F 1/166 248/346.03 |
| 2014/0325818 | A1* | 11/2014 | Mayfield | F16M 11/041 206/524.1 |
| 2015/0001105 | A1* | 1/2015 | Nyholm | G06F 1/1628 29/401.1 |
| 2015/0173221 | A1* | 6/2015 | Yoo | G06F 1/1626 248/455 |
| 2021/0222822 | A1* | 7/2021 | Wang | F16M 11/2021 |

* cited by examiner

*Primary Examiner* — Alfred J Wujciak
(74) *Attorney, Agent, or Firm* — Jose Cherson Weissbrot

(57) ABSTRACT

A mobile phone stand with an exhibition part comprises a stand part and an exhibition part. The stand part comprises a base frame, a support frame and a pivoting element, the support frame pivots between a closing position and at least one opening position with respect to the base frame by means of the pivoting element and is fixed, and the support frame has a support position allowing a mobile phone to be placed thereat. The exhibition part is rotatably connected to the support frame and comprises at least one cavity, and a flowing medium is disposed in the cavity.

6 Claims, 8 Drawing Sheets

MOBILE PHONE STAND WITH EXHIBITION PART

BACKGROUND OF THE INVENTION

1. Technical Field

The invention relates to mobile phone stands, in particular to a mobile phone stand with an exhibition part.

2. Description of Related Art

With the popularization smartphones, they have become important tools in people's work, life, and entertainment. To solve the problems that the hands of users will become fatigue due to long-term holding of mobile phones and the mobile phones cannot be placed on a desk to be watched by users, mobile phone stands come into being. Existing mobile phone stands typically comprise a base and a support plate, wherein the base is placed on a desk, a fixed angle is formed between the support frame and the base, and a mobile phone is placed on the support frame.

For example, US Patent Publication No. US20190078727A1 discloses a stand and a method for making the same. The stand comprises a base plate provided to support the stand on a support surface and/or by a user holding the base plate; a plurality of hinge assemblies connected to the base plate; and a platform assembly pivotally connected to the hinge assemblies, such that the angle between the platform assembly and the base plate is adjustable.

The mobile phone stand in this patent can only function as an auxiliary tool for supporting mobile phones, and occupies a large space when placed on a desk, and the stand has no ornamental value, cannot be folded to be stored, and does not have an exhibition effect for interactive entertainment.

In view of the above problems, it is necessary to provide a mobile phone stand with an exhibition part, which can be placed on a desk to serve as an auxiliary tool for supporting mobile phones, has high ornamental value and an exhibition effect for interactive entertainment, can be rotated to be folded so as to be stored and carried easily, and has good portability.

BRIEF SUMMARY OF THE INVENTION

The invention provides a mobile phone stand with an exhibition part, which comprises a stand part and an exhibition part, wherein stand part comprises a base frame, a support frame and a pivoting element, the support frame pivots between a closing position and at least one opening position with respect to the base frame by means of the pivoting element and is fixed, the support frame has a support position allowing a mobile phone to be placed thereat, the exhibition part is rotatably connected to the support frame and comprises at least one cavity, and a flowing medium is disposed in the cavity.

According to the mobile phone stand with an exhibition part provided by the invention, a locating device is disposed between the stand part and the exhibition part, and the exhibition part is located and exhibited on the stand part through the locating device.

BRIEF DESCRIPTION OF THE SEVERAL VIEWS OF THE DRAWINGS

To more clearly explain the technical solution of the application, drawings used for describing the implementations of the application will be briefly introduced below. Obviously, the drawings in the following description are merely for some implementations of the application, and those ordinarily skilled in the art can obtain other drawings according to the following ones without creative labor.

In the figures.

100, base frame; 200, support frame; 300, exhibition part; 101, receiving recess; 102, receiving groove; 201, upper frame; 202, lower frame; 203, support arm; 204, receding hole; 400, locating device; 401, magnetic element A; 402, magnetic element B; 500, push key; 501, sliding groove; 502, trigger part; 600, locating element.

DETAILED DESCRIPTION OF THE INVENTION

The technical solutions of the embodiments of the application will be clearly and completely described below in conjunction with the drawings of these embodiments. Clearly, the embodiments in the following description are merely illustrative ones, and are not all possible ones of the application. All other embodiments obtained by those ordinarily skilled in the art according to the following ones without creative labor should fall within the protection scope of the invention.

The term "embodiment" or "implementation" mentioned in this specification means that a specific feature, structure or characteristic described in the "embodiment" or "implementation" is included in at least one embodiment of the application. The term "embodiment" or "implementation" in different positions of this specification does not definitely refer to the same embodiment, or an independent or alternative embodiment mutually exclusive with other embodiments. Those skilled in the art can explicitly or implicitly understand that the embodiments described in this specification can be combined with other embodiments.

For the sake of convenience, terms indicating directional or positional relations such as "upper", "lower", "front", "back", "vertical", "horizontal", "top", "bottom", "inner" and "outer" in this specification are used to explain the positional relation between elements with reference to the accompanying drawings merely for the purpose of facilitating and simplifying the description of the invention, and do not indicate or imply that a device or element referred to must be in a specific direction, or configured and operated in a specific direction, and thus, they should not be construed as limitations of the disclosure. The positional relation between the elements changes properly according to the direction of the elements. Thus, the positional relation between the elements is not limited to the explanatory terms in this specification, and can change properly as the case may be.

As shown in FIG. 1-FIG. 8, the invention provides a mobile phone stand with an exhibition part, which comprises a stand part and an exhibition part, wherein the stand part comprises a base frame (100), a support frame (200) and a pivoting element, the exhibition part (300) comprises at least one cavity, and a flowing medium is disposed in the cavity.

Figure 1:
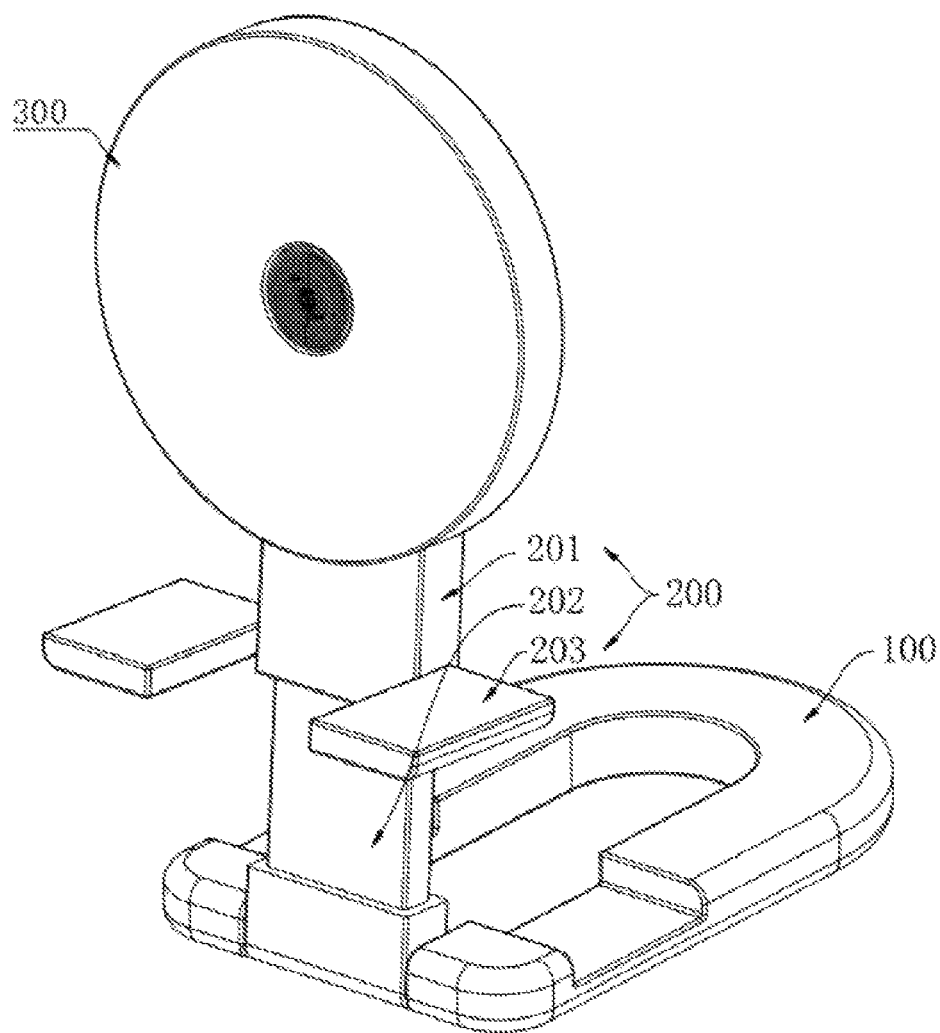
FIG. 1 is a structural view of one specific implementation of the invention.

As a preferred embodiment of the invention, as shown in FIG. 1, the support frame (200) pivots between a closing position and at least one opening position with respect to the base frame (100) by means of the pivoting element and is fixed, and the support frame (200) has a support position allowing a mobile phone to be placed thereat. Specifically, a support arm (203) is rotatably disposed on each of two sides of the support frame (200), and the exhibition part (300) is rotatably connected to the support frame (200).

In this embodiment, the pivoting element is preferably a damping shaft, the base frame 100 and the support frame 200 are hinged together through the damping shaft and are able to rotate relatively to be supported by each other at different angles, the base frame 100 is placed on a desk, and the support frame 200 is obliquely disposed on the base frame 100 and is able to rotate through the damping shaft to form different angles with the base frame 100, such that the requirement of users for adjusting a mobile phone placed on the stand to different angles is met. It can be understood that the support frame 200 can also rotate to be attached to the base frame 100 to be folded. In some embodiments, the pivoting element may be a spring and provided with a corresponding angle brake assembly. In some embodiments, the pivoting element may be a gear ring assembly.

When a mobile phone is placed at the support position, the back side of the mobile phone abuts against a support surface of the support frame 200, the exhibition part 300 is rotatably connected to the top of the support frame 200 and can rotate to drive the flowing medium in the cavity of the exhibition part 300 to flow to different ends of the exhibition part 300 to realize an exhibition effect for interactive entertainment, and the flowing medium can be observed through the exhibition part 300 and can make contact with the cavity of the exhibition part 300 to make sounds in the flowing process.

Figure 3:
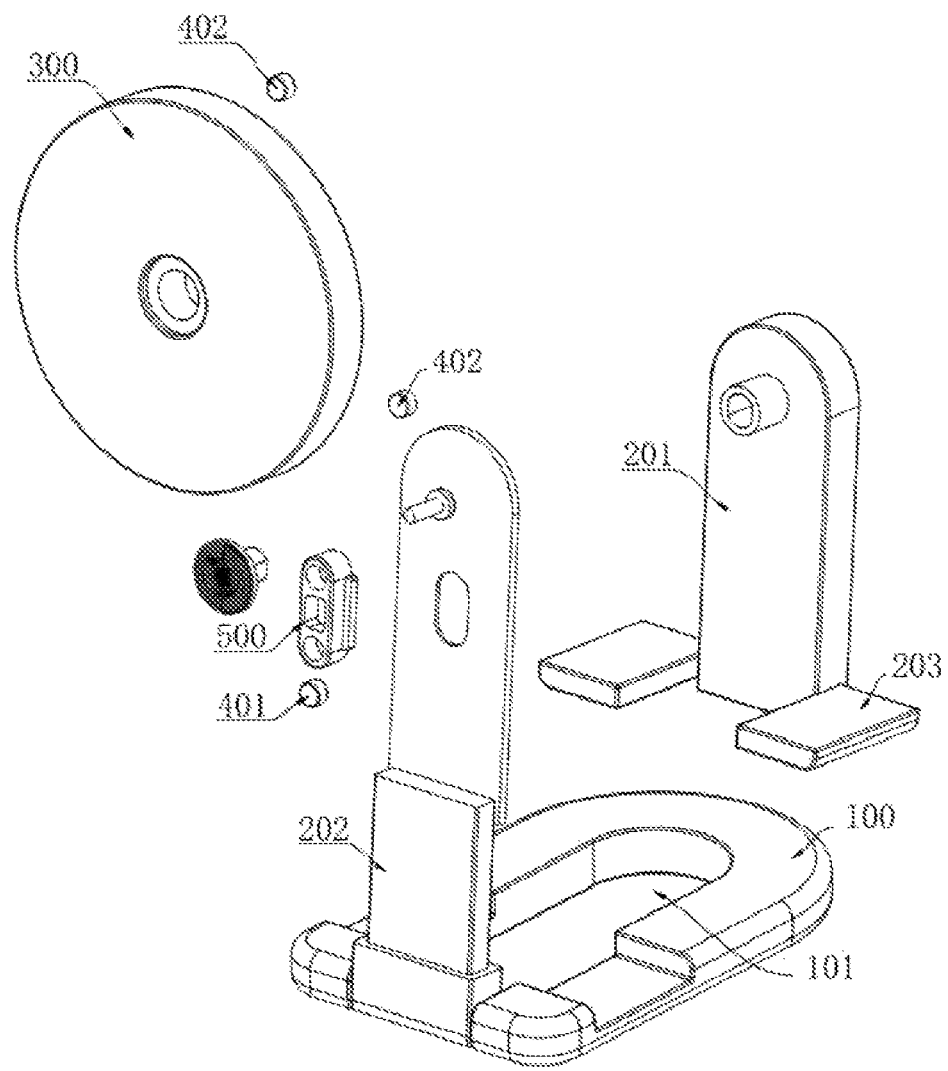
FIG. 3 is an exploded structural view of one specific implementation of the invention.
Figure 4:
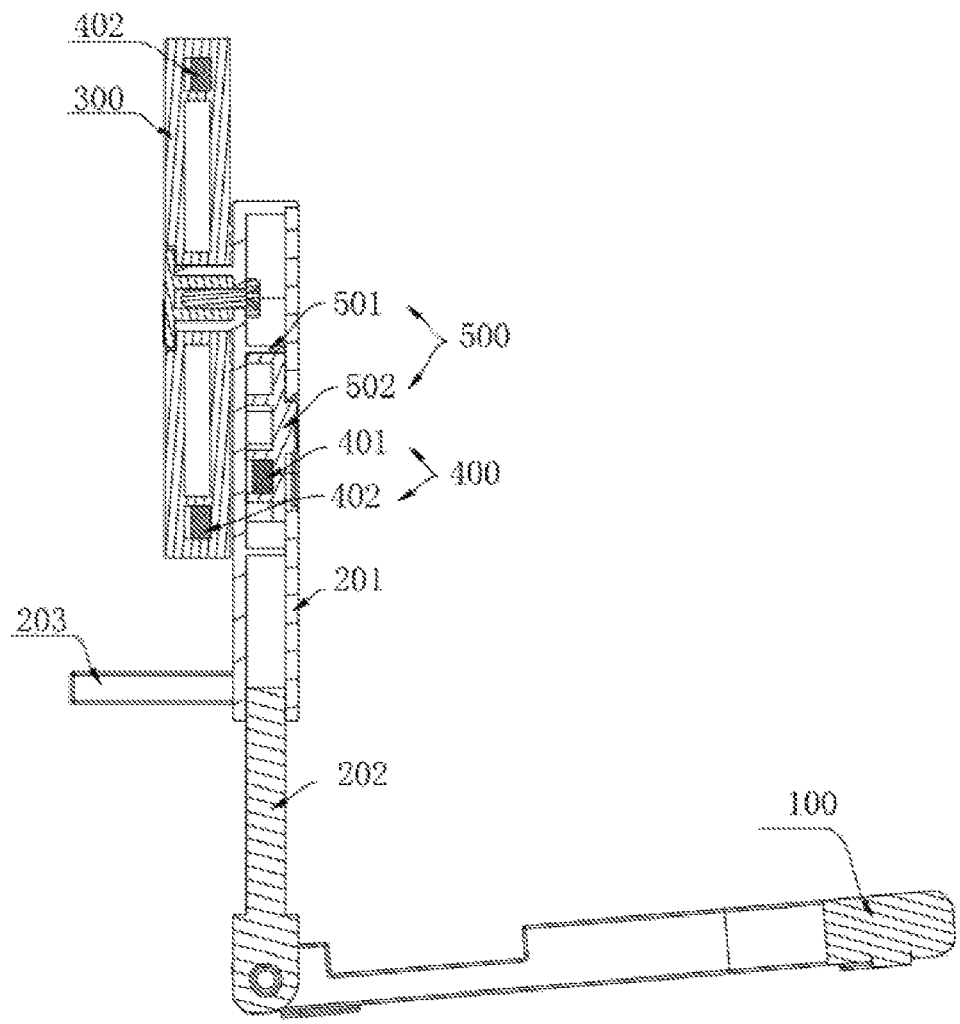
FIG. 4 is a sectional structural view of one specific implementation of the invention.

To improve the exhibition effect of the exhibition part 300, as shown in FIG. 3 and FIG. 4, a locating device 400 is disposed between the stand part and the exhibition part 300, and the exhibition part 300 is located and exhibited on the stand part through the locating device 400.

Specifically, the locating device 400 comprises a magnetic element A 401 movably disposed on the base frame 100 or the support frame 200, and a magnetic element B 402 located and disposed on the exhibition part 300, and the exhibition part 300 is located and fixedly exhibited on the stand part through magnetic attraction of the magnetic element A 401 and the magnetic element B 402; the magnetic element A 401 can move to or away from a position where it is correspondingly connected to the magnetic element B 402; when the magnetic element A 401 moves away from the position where it is correspondingly connected to the magnetic element B 402, the exhibition part 300 can rotate on the support frame 200 smoothly; and when the magnetic element A 401 moves to the position where it is correspondingly connected to the magnetic element B 402, the exhibition part 300 stops rotating and is located and fixed on the support frame 200.

To better reflect the exhibition effect of the exhibition part 300, the exhibition part 300 comprises at least one visible window, and the flowing liquid medium and/or fine particle medium stored in the cavity can be observed through the visible window.

Specifically, the exhibition part 300 may comprise one or more visible windows used for observing the medium in the cavity. As a preferred embodiment of the invention, the exhibition part 300 is made of a transparent material and is a circular transparent shell, a cavity for allowing a liquid medium and/or fine particle medium to flow therein to realize an exhibition effect is formed in the exhibition part 300, and the exhibition part 300 may be, but not limited to, a sand glass device containing fine sand or ink. In some embodiments, the exhibition part 300 may comprise multiple visible windows, and the corresponding number of exhibition cavities are formed in the exhibition part 300, such that when the exhibition part 300 rotates to be exhibited, a three-dimensional dynamic exhibition effect can be realized through the cooperation of the multiple visible windows and the flowing medium. In some embodiments, the exhibition part 300 may be rectangular, triangular, or in any other desired shapes.

Further, as shown in FIG. 1, the center of the exhibition part 300 is rotatably connected to the top of the support frame 200, and the rotating direction of the exhibition part 300 is perpendicular to the pivoting direction of the support frame 200, that is, the exhibition part 300 rotates in a direction relatively parallel to the support frame 200. It should be pointed out that the direction relatively parallel to the support frame 200 is not an exactly or absolutely parallel direction.

Figure 2:
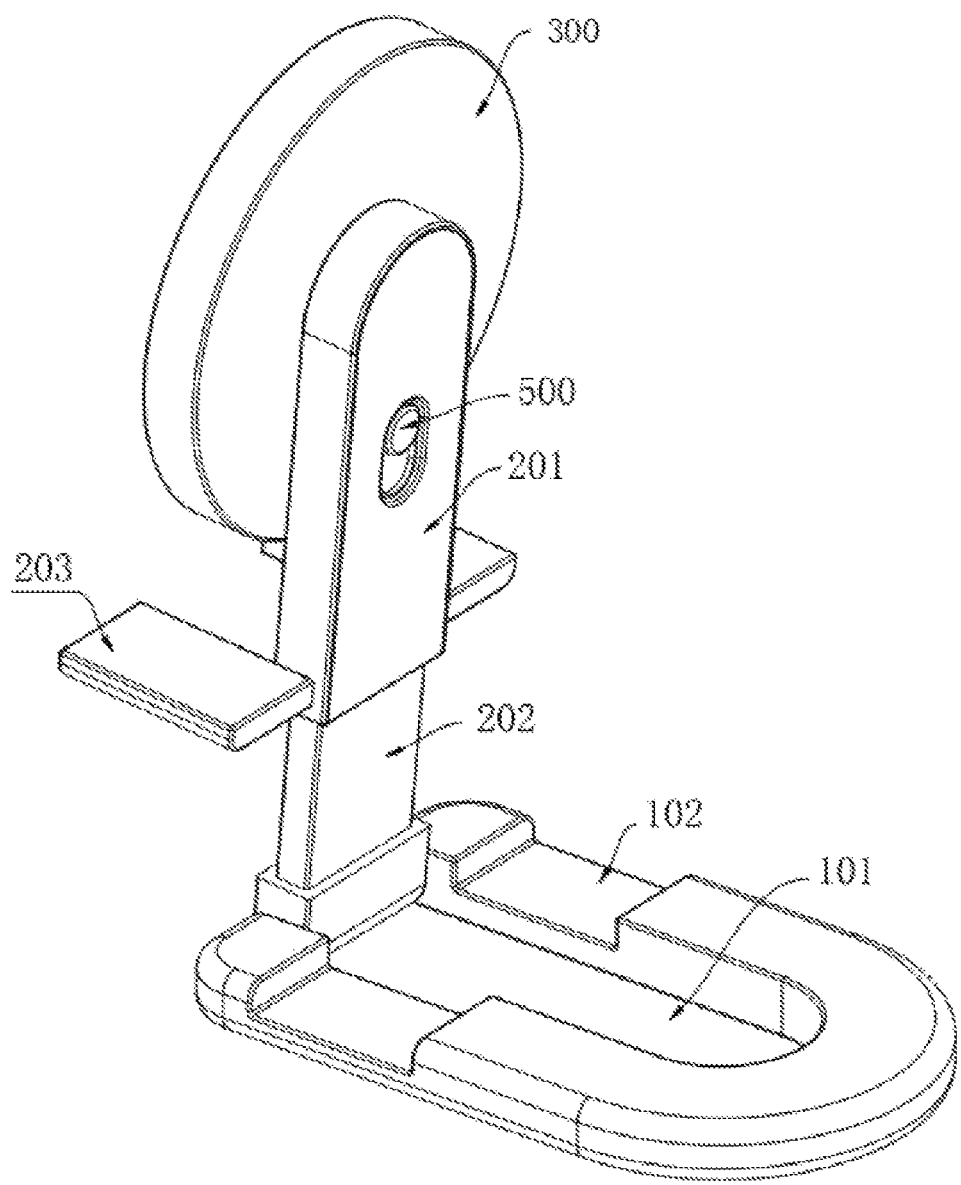
FIG. 2 is a structural view of one specific implementation of the invention from another perspective.

In this embodiment, as shown in FIG. 2 and FIG. 3, the magnetic element B 402 is located and disposed at an end of the exhibition part 300 and is rotatably connected to the support frame 200 through the exhibition part 300, a sliding groove 501 is formed in the support frame 200, a push key 500 is slidably inlaid in the sliding groove 501, the magnetic element A 401 is mounted on the push key 500, and by moving the push key 500, the magnetic element A 401 can be driven to move to or away from the position where it is matched and connected with the magnetic element B 402.

As a preferred embodiment of the invention, to further reduce the storage space, the base frame 100 has at least one receiving space, and the receiving space is configured to receive the support frame and the exhibition part. Specifically, a receiving recess 101 matched with the support frame 200 in shape and receiving grooves 102 matched with the support arms 203 in shape are formed in the base frame 100, and the support frame 200 and the support arms 203 are rotatably received in the receiving recess 101 and the receiving grooves 102 respectively, such that the mobile phone stand is more convenient to carry and store and saves space.

Figure 5:
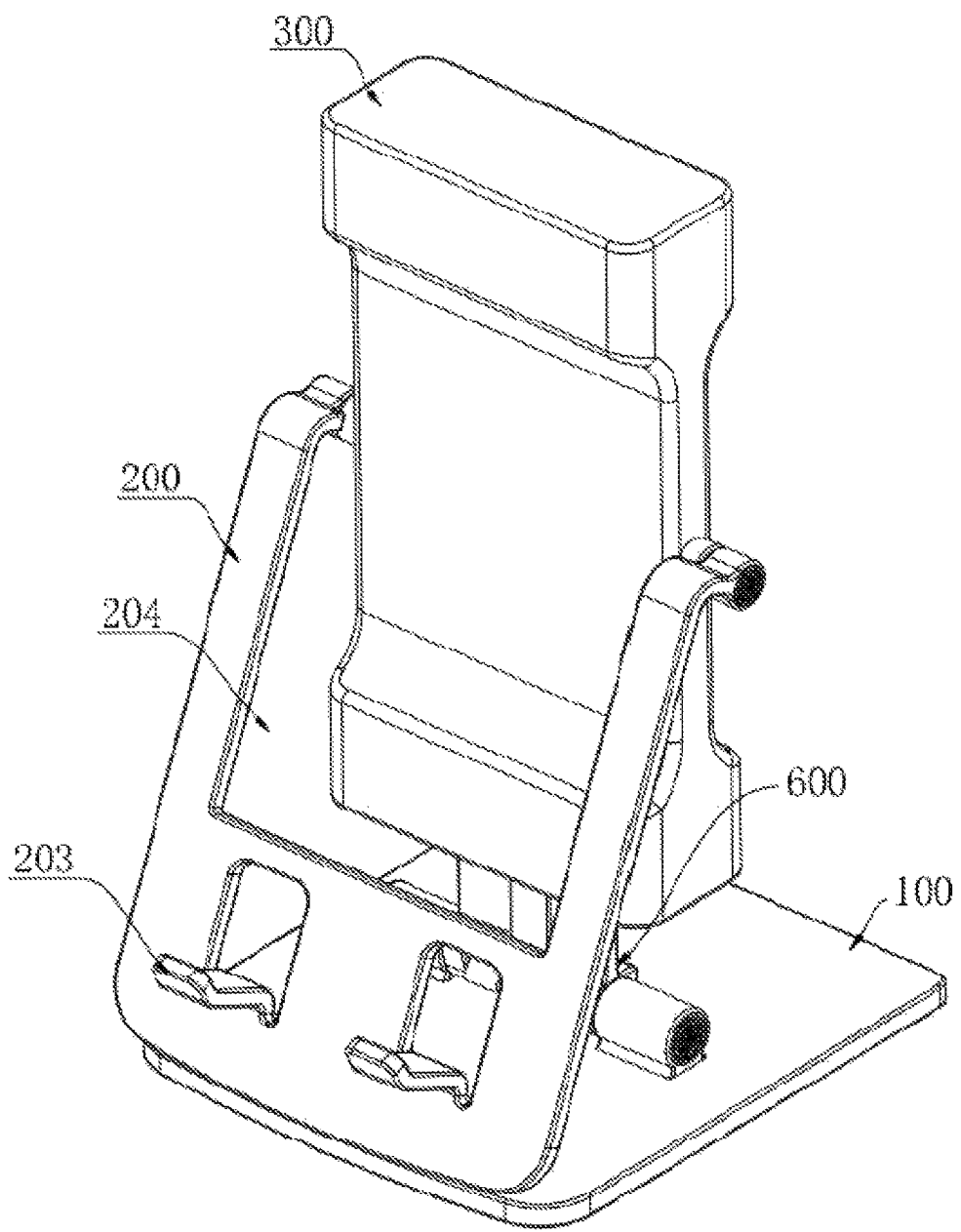
FIG. 5 is a structural view of another specific implementation of the invention.

In another embodiment of the invention, as shown in FIG. 5 to FIG. 8, the middle of each of two sides of the exhibition part 300 is connected to the top of the support frame 200, and the rotating direction of the exhibition part 300 is the same as the pivoting direction of the support frame 200. Specifically, the exhibition part 300 rotates in a direction relatively perpendicular to the support frame 200. It should be pointed out that the direction relatively perpendicular to the support frame 200 is not an exactly or absolutely perpendicular direction. As another preferred embodiment of the invention, as shown in FIG. 5, a receding hole 204 allowing the exhibition part 300 to rotate to pass through is formed in the support frame 200, such that the exhibition part 300 can rotate by 360°. In this embodiment, the shape of the receding hole 204 is matched with the outer contour of the exhibition part 300. In some other embodiments, the shape of the receding hole 204 can be changed as actually needed, such that the receding hole 204 is more beautiful without affecting the function of allowing the exhibition part 300 to rotate to pass through.

Figure 6:
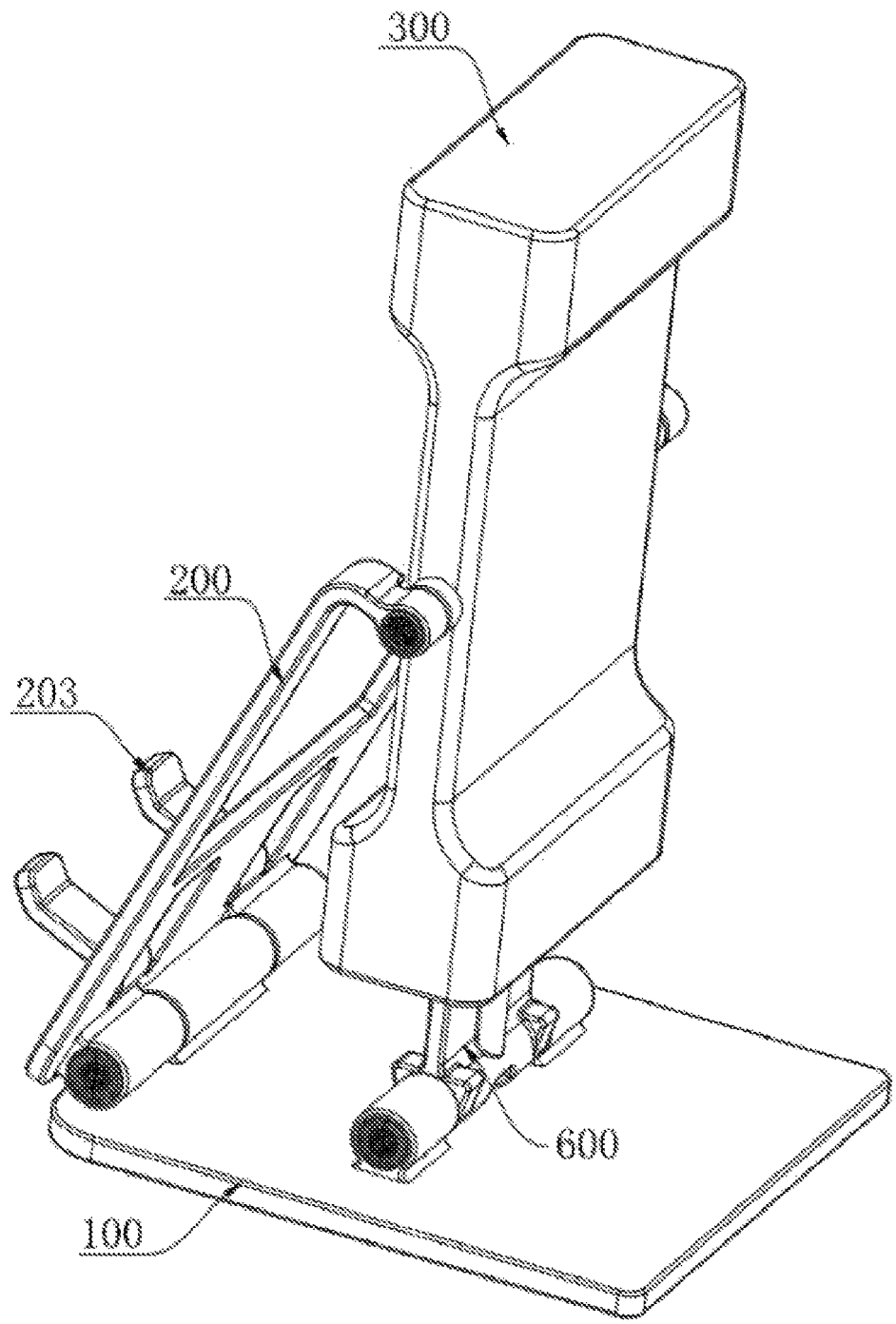
FIG. 6 is a structural view of another specific implementation of the invention from another perspective.
Figure 7:
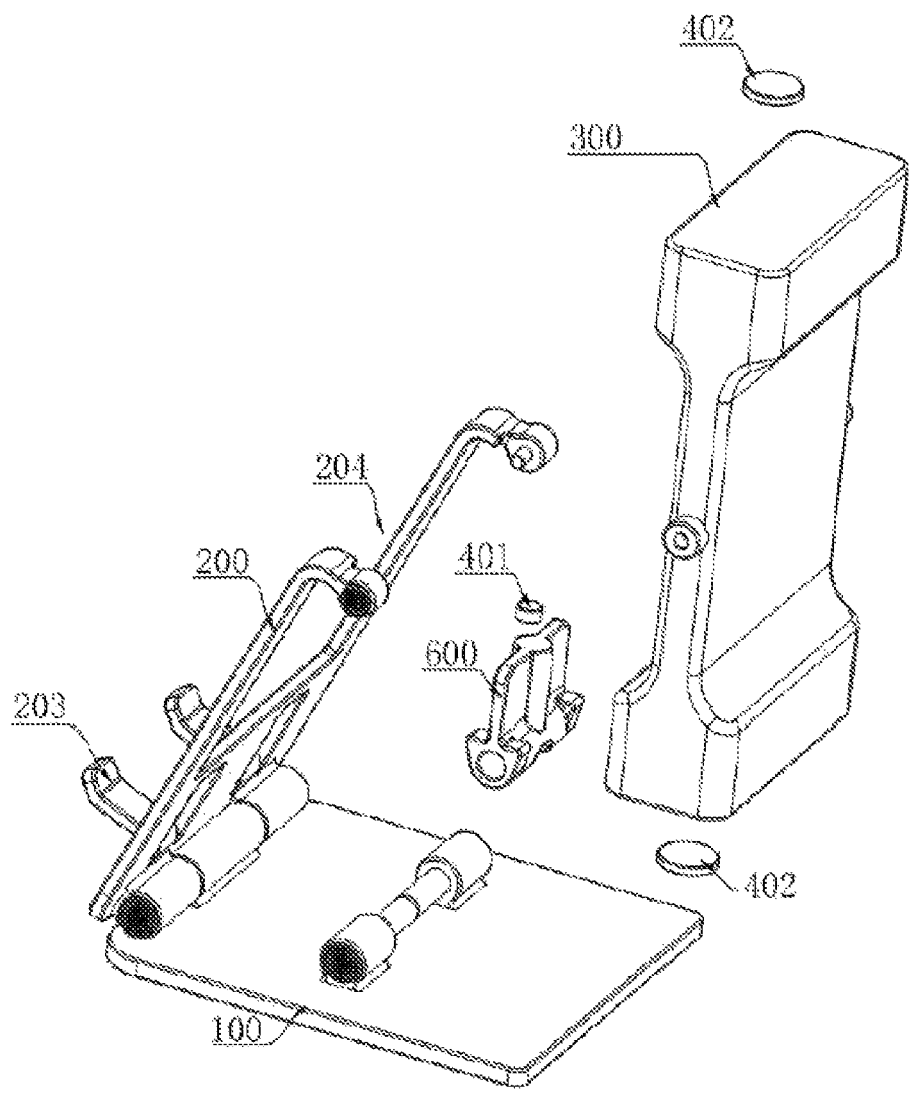
FIG. 7 is an exploded structural view of another specific implementation of the invention.

In another embodiment of the invention, as shown in FIG. 6 and FIG. 7, a locating element 600 is rotatably disposed on the base frame 100 and is hinged to the base frame 100 through a damping shaft, such that the locating element 600 can be erected on the base frame 100 at different angles. In some embodiments, the locating element 600 can rotate through the damping shaft to be folded and stored on the base frame 100. In some embodiments, the damping shaft may be other pivoting elements, such as a torsion spring, a gear ring or other assemblies capable of realizing angle adjustment and locating functions.

To further improve the exhibition effect, as shown in FIG. 7, a magnetic element A 401 is mounted on the locating element 600, a magnetic element B 402 is fixedly mounted at the top and/or bottom of the exhibition part 300, and by rotating the locating element 600, the magnetic element A 401 can be driven to move to or away from a position where it is matched and connected with the magnetic element B 402.

Figure 8:
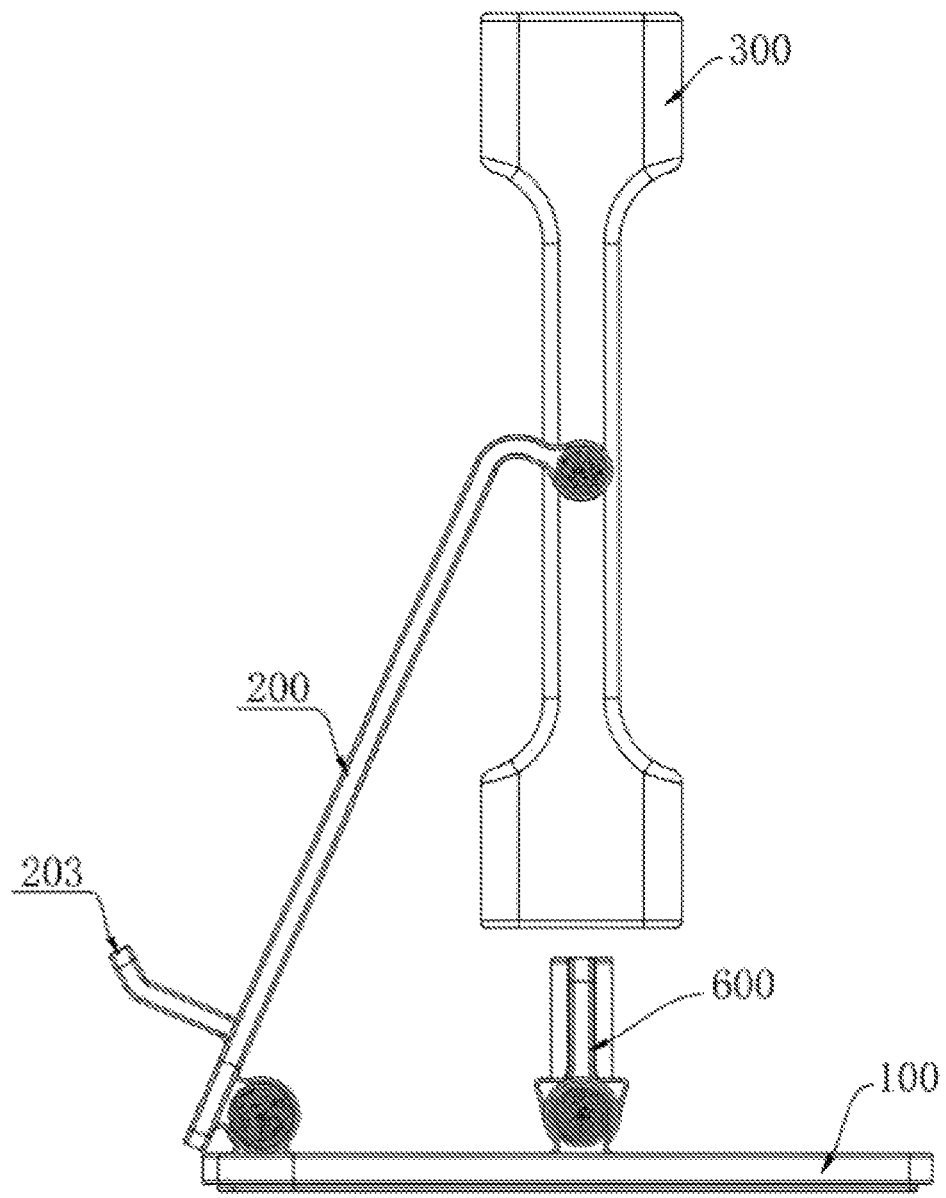
FIG. 8 is a side view of another specific implementation of the invention.

In another embodiment of the invention, as shown in FIG. 7 and FIG. 8, support arms 203 used for supporting a mobile phone are disposed on the support frame 200 and are located below the receding hole 204; when the mobile phone is horizontally placed on the support arms 203, the back side of the mobile phone abuts against a support surface of the support frame 200; when the mobile phone is vertically placed on the support arms 203, the mobile phone upwardly protrudes out of the receding hole 204 and will interfere with the exhibition part 300 when the back side of the mobile phone abuts against the support frame 200, at this moment, the exhibition part 300 will rotate to be located on the same plane as the support frame 200, and one surface of the exhibition part 300 forms the support surface for supporting the mobile phone.

In the invention, the exhibition part is disposed on the mobile phone stand, and the exhibition manner of the exhibition part is set to ensure that the exhibition part can rotate by 360° with respect to the mobile phone stand; a flowing medium is disposed in the exhibition part, and when the exhibition part rotates, the flowing medium can flow in different directions, such that a good dynamic exhibition effect and an ornamental effect are realized; the locating device disposed between the stand part and the exhibition part can further limit the direction of the end of the exhibition part to ensure that the exhibition part can be located and exhibited on the stand part, such that a good interactive entertainment effect is realized; moreover, the base frame, the support frame and the exhibition part can rotate relatively to realize an exhibition effect at different angles, and can also rotate to be folded so as to be stored and carried easily, thus having good portability.

In specific use, to gain a good understanding of the invention, the following two product embodiments are provided:

Product Embodiment 1: referring to FIG. 1-FIG. 4, a mobile phone stand with an exhibition part 300 comprises a base frame 100 and a support frame 200 which are hinged together along one side, wherein the base frame 100 and the support frame 200 can rotate relatively to be supported by each other at different angle, such that the requirement for adjusting a mobile phone placed on the stand to different angles is met; the support frame 200 has a support position allowing a mobile phone to be placed thereat, an exhibition part 300 is disposed on the support frame 200, the center of the exhibition part 300 is rotatably connected to the top of the support frame 200, the exhibition part 300 rotates in a direction relatively parallel to the support frame 200, and a locating device 400 used for locating and exhibiting the exhibition part 300 is disposed between the support frame 200 and the exhibition part 300; the exhibition part 300 is a circular transparent shell, a flowing liquid medium or a fine particle medium is disposed in a cavity of the transparent shell, and it can be understood that the exhibition part 300 may be, but not limited to, a drip device containing ink or a sand glass device containing fine sand; the locating device 400 comprises magnetic elements B 402 fixedly disposed at two opposite ends of the exhibition part 300, and a magnetic element A 401 movably disposed on the support frame 200 and magnetically connected to the magnetic elements B 402, the magnetic elements B 402 rotate with the exhibition part 300, and when the magnetic element A 401 rotates to position where it is correspondingly connected to the magnetic elements B 402, the exhibition part 300 is located on the support frame 200; otherwise, when the magnetic element A 401 moves away from the position where it is correspondingly connected to the magnetic elements B 402, the exhibition part 300 can rotate on the support frame 200 smoothly; a sliding groove 501 is formed in the support frame 200, a push key 500 is slidably inlaid in the sliding groove 501 and can move vertically and linearly in the sliding groove 501 of the support frame 200, the push key 500 is provided with a trigger part 502 to be pushed by fingers and a part allowing the magnet element A 401 to be mounted thereon, and the push key 500 can be slid to drive the magnetic element A 401 to move to or away from the position where it is correspondingly connected to the magnetic elements B 402; and the bottom side of the support frame 200 is hinged to the front side of the base frame 100 through a damping shaft, the support frame 200 comprises an upper frame 201 and a lower frame 202, the upper frame 201 and the lower frame 202 are inserted into each other to be connected, the push key 500 and the exhibition part 300 are both disposed on the upper frame 201, the upper frame 201 and the lower frame 202 can move upwards or downwards relatively to adjust the support height of the support frame 200. Support arms 203 used for supporting a mobile phone are disposed on the upper frame 201 and are rotatably connected to two sides of the upper frame 201, and the support arms 203 can rotate to form a 90° angle with the upper frame 201 to be used for supporting the mobile phone and can also rotate to be folded to be on the same plane as the upper frame 201; a receiving recess for receiving the support frame 200 and receiving grooves 102 allowing the support arms 203 to be placed therein are formed in the bottom frame 100; and when the mobile phone stand is folded, the lower frame 202 of the support frame 200 moves to be folded in the upper frame 201, the support arms 203 rotate to be on the same plane as the upper frame 201, then, the support frame 200 rotates to be received in the receiving recess of the bottom frame 100, and the support arms 203 are received in the receiving grooves 102 of the base frame 100.

Product Embodiment 2: referring to FIG. 5-FIG. 8, a mobile phone stand with an exhibition part 300 comprises a base frame 100 and a support frame 200 which are hinged together, wherein an exhibition part 300 is rotatably disposed at the top of the support frame 200, and a locating element 600 for locating and exhibiting the exhibition part 300 is disposed on the base frame 100; the exhibition part 300 is a square transparent shell, front and back sides of the transparent shell are concaved inwards, a flowing liquid medium or a fine particle medium is disposed in a cavity of the transparent shell, and it can be understood that the exhibition part 300 may be, but not limited to, a drip device containing ink or a sand glass device containing fine sand; a receding hole 204 allowing the exhibition part 300 to rotate to pass through is formed in the support frame 200, the middle of each of the two sides of the exhibition part 300 is rotatably connected to an upper side of the support frame 200, and the exhibition part 300 rotates in a direction perpendicular to the support frame 200, such that the exhibition part 300 can rotate by 360° to be connected to the support frame 200; support arms 203 used for supporting a mobile phone are disposed on the support frame 200 and are located below the receding hole 204; when the mobile phone is vertically placed on the support arms 203, the exhibition part can rotate to a suitable angle to abut against the back side of the mobile phone, such that a support surface for supporting the mobile phone is formed; and a locating element 600 is hinged to the base frame 100 through a damping shaft, and thus can be erected on the base frame 100 at different angles; a magnetic element A 401 is mounted on the locating element 600, a magnetic element B 402 is located and fixedly mounted at the top and/or bottom of the exhibition part 300, and by rotating the locating element 600, the magnetic element A 401 can be driven to move to or away from the position where it is matched and connected with the magnetic element B 402. When the mobile phone stand is folded, the exhibition part 300 rotates to pass through the receding hole 204 of the support frame 200, the support frame 200 rotates to be parallelly folded on the base frame 100, one side of the exhibition part 300 abuts against the base frame 100, and the locating element 600 rotates to be in parallel with the base frame 100 and located between concave parts of the exhibition part 300, such that the mobile phone stand is folded and can be carried easily.

The technical means disclosed by the solution of the invention are not limited to those disclosed in the above embodiments, and also include technical solutions formed by any combinations of the above technical features. It should be pointed out that those ordinarily skilled in the art can make some improvements and embellishments without departing from the principle of the invention, and all these improvements and embellishments fall within the protection scope of the invention.

What is claimed is:

1. A mobile phone stand with an exhibition part, comprising:

a stand part, wherein the stand part comprises a base frame (100), a support frame (200) and a pivoting element, the support frame (200) pivots between a closing position and at least one opening position with respect to the base frame (100) by the pivoting element and is fixed, and the support frame (200) has a support position allowing a mobile phone to be placed thereat; and an exhibition part (300), wherein the exhibition part (300) is rotatably connected to the support frame (200) and comprises at least one cavity, and a flowing medium is disposed in the cavity, wherein the exhibition part (300) comprises at least one visible window, wherein the exhibition part rotates, the flowing medium configured to flow in different directions to provide dynamic exhibition and ornamental effects through the at least one visible window.

2. The mobile phone stand with an exhibition part according to claim 1, wherein a locating device (400) is disposed between the stand part and the exhibition part (300), and the exhibition part (300) is located and exhibited on the stand part through the locating device (400).

3. The mobile phone stand with an exhibition part according to claim 2, wherein the locating device (400) comprises a magnetic element A (401) and a magnetic element B (402), the magnetic element A (401) is movably disposed on the base frame (100), and the magnetic element B (402) is located and disposed on the exhibition part (300).

4. The mobile phone stand with an exhibition part according to claim 3, wherein a rotating direction of the exhibition part (300) is the same as a pivoting direction of the support frame (200), a receding hole (204) allowing the exhibition part (300) to rotate to pass through is formed in the support frame (200), and support arms (203) used for supporting the mobile phone are disposed below the receding hole (204).

5. The mobile phone stand with an exhibition part according to claim 4, wherein a locating element (600) is rotatably disposed on the base frame (100), the magnetic element A (401) is mounted on the locating element (600), the magnetic element B (402) is mounted at a top and/or bottom of the exhibition part (300), and by rotating the locating element (600), the magnetic element A (401) can be driven to move to or away from a position where it is matched and connected with the magnetic element B (402).

6. The mobile phone stand with an exhibition part according to claim 3, wherein a rotating direction of the exhibition part (300) is perpendicular to a pivoting direction of the support frame (200), and the magnetic element A (401) is movably disposed on the support frame (200), and is able to move to a position where it is matched and connected with the magnetic element B (402).

* * * * *